US006484582B2

(12) United States Patent  
Ehrfeld et al.

(10) Patent No.: US 6,484,582 B2
(45) Date of Patent: Nov. 26, 2002

(54) ROLLING BEARING WITH SENSING UNIT WHICH CAN BE REMOTELY INTERROGATED

(75) Inventors: Wolfgang Ehrfeld, Mainz (DE); Volker Graeff, Mainz (DE); Frank Michel, Nieder-Olm (DE); Sven Gempper, Volkach (DE); Jens Heim, Schweinfurt (DE); Joachim Hering, Würzburg (DE); Horst Masuch, Schweinfurt (DE); Edgar Streit, Poppenlauer (DE); Vasilis Hassiotis, München (DE); Henri Van Der Knokke, Niederwerrn (DE)

(73) Assignees: FAG OEM und Handel AG (DE); Institut fur Mikrotechnik Mainz GmbH (DE)

( * ) Notice: Subject to any disclaimer, the term of this patent is extended or adjusted under 35 U.S.C. 154(b) by 0 days.

(21) Appl. No.: 09/829,808

(22) Filed: Apr. 10, 2001

(65) Prior Publication Data

US 2002/0062694 A1 May 30, 2002

(30) Foreign Application Priority Data

Apr. 10, 2000 (DE) .......................................... 100 17 572

(51) Int. Cl.[7] ........................ G01M 13/02; G01N 29/00
(52) U.S. Cl. ......................... 73/593; 384/448; 384/535
(58) Field of Search ........................ 73/593, 659, 660; 384/448, 535

(56) References Cited

U.S. PATENT DOCUMENTS

| 3,952,566 A | * | 4/1976 | Jacobson ........................ 73/10 |
| 4,237,454 A | * | 12/1980 | Meyer .................... 310/323.21 |
| 5,872,520 A | * | 2/1999 | Seifert et al. ................ 333/154 |
| 6,260,415 B1 | * | 7/2001 | Goebel et al. ................ 73/582 |
| 6,318,147 B1 | * | 11/2001 | Steinruck et al. .............. 73/120 |
| 2002/0054719 A1 | * | 5/2002 | Takizawa et al. ........... 384/448 |

FOREIGN PATENT DOCUMENTS

| WO | WO 99/31500 | * | 6/1999 | .......... G01N/29/04 |

* cited by examiner

Primary Examiner—Daniel S. Larkin
Assistant Examiner—Rose M. Miller
(74) Attorney, Agent, or Firm—Ostrolenk, Faber, Gerb & Soffen, LLP (57) ABSTRACT

A rolling bearing which has as rolling bearing components one bearing race with a first running surface, a second bearing race with a second running surface opposed to the first surface, and rolling elements arranged between the running surfaces. At least one sensing unit is integrated into the rolling bearing components. The sensing unit can be interrogated by radio via antennas or can be connected to an interrogator by a cable. The sensing unit uses at least one component operating on the SAW or BAW principle to sense changes in length and/or changes in temperature in the material of the rolling bearing component and sends the result of the measurement after the arrival of a radio signal via the antenna or via a cable.

13 Claims, 7 Drawing Sheets

ROLLING BEARING WITH SENSING UNIT WHICH CAN BE REMOTELY INTERROGATED

BACKGROUND OF THE INVENTION

The invention relates to rolling bearings with a sensing unit which can be remotely interrogated for sensing rolling bearing data. The sensing unit in this case includes at least one acoustoelectronic component which operates on the SAW principle or BAW principle.

DESCRIPTION OF RELATED ART

Bearing with Sensors

Known rolling bearings may include units for sensing rolling bearing data, such as forces acting on the bearing or structure-borne sound occurring in the operating state.

Among devices suitable for the early detection of damage or for monitoring the operating state of a machine are sensing units arranged directly on the rolling bearings. For example, the structure-borne sound which occurs at the rolling bearing and which is important for the early detection of damage or the forces supported by the rolling bearing can be determined by sensing units arranged on the rolling bearing.

In what are known as force-measuring bearings, for example, in U.S. Pat. No. 5,952,587, the rolling bearings are provided with strain gages to measure forces acting on the bearing. The strain gages are usually arranged in recesses on the outer side of the outer race and/or in the bore of the inner race. The force-measuring bearing works on the principle that the forces supported in the bearing cause deformations in the bearing races. These deformations are transferred to the strain gages that are fastened on the outer or inner race and produce changes in electrical resistance which can be measured. The low sensitivity and resolution of the strain gages with respect to the deformations which can be sensed are disadvantageous. Further, on account of the susceptibility of the strain gages to shock, it is necessary for such rolling bearings that are provided with strain gages to be handled with corresponding care. Furthermore, the strain gages cannot sense any structure-borne sound that occurs in the bearings, since the strains caused by the structure-borne sound waves are too small. Furthermore, the high temperature dependence of the strain gages can cause great errors when measuring small strains, as described in the "Handbuch für experimentelle Spannungsanalyse" [handbook for experimental stress analysis], published by Professor Christof Rohrbach, VDI-Verlag, Düsseldörf, 1989.

The VDI Progress Report, Series 8, No. 729, Section 1.2, mentions the fitting of shafts with strain-gage-based torque pickups. The shafts are in this case reduced in diameter to the extent that the stresses or strains occurring due to the loading fully utilize the elastic range of the material used. This is because it is the only way in which adequately accurate sensing of the strains and stresses is possible with the strain gages. In an application of these strain-gage-based torque pickups in rolling bearings, the necessary reduction in the cross sections of the rolling bearing components would greatly reduce the operational reliability and service life of the rolling bearings. Conversely, dimensioning appropriate for rolling bearings leads to inadequate accuracy when strain-gage torque pickups are used.

Saw Sensor and Identification Systems

Components which operate on the SAW principle are known. They are used in particular in the form of frequency filters in the area of telecommunications and in audio equipment. Likewise known are SAW arrangements with sensor and/or identification functions which can be interrogated by wire-bound or radio links.

A sensor including a SAW device which can be interrogated by radio is described in DE 42 00 076-A1, published Aug. 6, 1993.

SAW sensors can be used for measuring stress, temperature, pressure and acceleration and also as chemical and biological sensors. See the document Sensorik [sensor technology), Vol. 8, published by Karl Walter Bonfig, Expert Verlag, "Möglichkeiten und Grenzen der Oberflächenwellen-Sensorik" [possibilities and limitations of surface-wave sensor technology], from page 25.

A passive sensor operating on the SAW principle which can be wirelessly interrogated is described in EP 619 906 B1. The sensor contains first SAW structures as sensor elements and second SAW structures as reference elements. The measured values which can be interrogated are formed from a comparison of the response signals of the sensor and reference elements resulting from the interrogation signals.

A sensor system for monitoring the grip of vehicle tires on the roadway is specified in DE 198 07 004 A1. In this case, sensors which can be remotely interrogated by radio are integrated with SAW elements in the vehicle tire close to the tire carcass. The sensors can in this case supply the monitoring system with measured values concerning various tire operating variables, such as pressure, vibration, wear and identification. That patent application likewise refers to the possibility of coupling the SAW element with other classic sensor elements, for example, capacitive acceleration pickups. In this case, the SAW element serves not only as a signal transmitter but also as an energy supply means for the capacitive sensor.

Fitting of SAW elements into a shaft, for example for measuring torque, is described in the literature (Sensorik, Vol 8, Karl Walter Bonfig, Expert Verlag). No mention is made, however, of the integration of SAW elements in rolling bearings for sensing rolling bearing data or structure-borne sound.

Furthermore, it is known to provide SAW elements with an identification function, although the storing of further parameters, such as characteristic variables, in the SAW elements is not described. The characteristic variables stored according to the present invention may be used in the interrogation units in combination with the values measured by the sensors, in order to ascertain corresponding descriptions of states appropriately devised for the rolling bearings respectively in use.

The combination of the aforementioned identification and sensor functions in a sensing unit with a SAW element is mentioned in various publications. Examples of such combined identification and sensor systems are described in DE 42 17 049 A1, U.S. Pat. No. 5,872,520 and DE 198 54 606 A1.

Apart from the SAW elements described above and their possible applications, bulk acoustic wave (BAW) elements are also known. For instance, the document "Remote Sensing using Quartz Sensors", written by Sachs, Thomas et al., appearing in SPIE Vol. 2718, page 47 et seq., mentions not only SAW elements but also the use of BAW elements for sensing mechanical stresses in a shaft.

The full disclosure of each reference, patent or publication mentioned herein is incorporated by reference in the present patent application.

SUMMARY OF THE INVENTION

In order to address these problems of the prior art, the invention provides a rolling bearing with a sensing unit which can be remotely interrogated and that has adequate sensitivity and resolution with respect to the rolling bearing data to be sensed.

Sensing units which can be remotely interrogated, with at least one acoustoelectronic component operating on the SAW principle or BAW principle, can sense rolling bearing data, such as measured variables and/or rolling bearing parameters. The sensing units may be arranged on the rolling bearing components, such as the outer race, inner race, cage, seal, rolling elements and/or conversion parts integrated in the bearing. The sensing units may be fitted in machined recesses on the rolling bearing components, for example in groove-shaped depressions that extend circumferentially along or transversely across the races.

SAW components are acoustoelectronic elements in which at least a partial region of a substrate surface is provided with piezoelectric properties. Finger-shaped or interdigital electrode structures in various shapes may be applied on or in the piezoelectric region of the substrate surface. Electric signals can be transformed by means of these electrode structures in the piezoelectric surface region into surface waves on the substrate surface, usually known as surface acoustic waves (SAW). The propagating surface waves can in turn be changed back into electric signals by means of other electrode surfaces or even by the electrode structures used for generating the surface waves. Reflecting structures can also be provided on the substrate surface. A variety of possibilities for the formation of the electrode structures and the selection of suitable materials allow these surface-wave or SAW components to be adapted to different applications in the frequency-filter and sensor area.

BAW components, like the SAW components, are acoustoelectronic elements which contain regions with piezoelectric properties. In the case of BAW elements, electric signals are coupled into the component by means of electrode structures in or on the piezoelectric region of the components. They do not propagate on the substrate surface in the form of surface waves but rather in the form of acoustic bulk waves in the substrate, also known as bulk acoustic waves (BAW). The propagating bulk waves can also be changed back again into electric signals in these BAW elements by means of electrode structures.

According to a first embodiment, the sensing unit can be remotely interrogated via a cable. For this purpose, the sensing unit is advantageously connected to one or more interrogation units via a cable. It is also possible for a plurality of sensing units of a rolling bearing to be connected to an interrogation unit via a cable. Remote interrogation via a cable allows a high-frequency interrogation of the rolling bearing data to be sensed, which is of particular advantage, especially for structure-borne sound analysis. Remote interrogation begins with a control pulse, which activates the sensing units on the cable. The response of individual sensing units is sent back via the same cable after a time interval.

In a second embodiment, the sensing unit can be interrogated by radio. This makes it possible to dispense with a cable connection to interrogation units. In an advantageous variant, the sensing-unit has an antenna integrated into it for this purpose. The antenna can be integrated into the component based on the SAW and/or BAW principle.

In a further variant, the sensing unit is connected to an antenna for remote interrogation. For a rolling bearing that is completely surrounded by a metal housing, it is conceivable to not provide the antenna directly on the sensing unit but to lead it out of the direct vicinity of the rolling bearings via a cable connection.

In the above variant, the antenna is advantageously arranged on the rolling bearing. For this purpose, the antenna is arranged particularly advantageously on the same rolling bearing component as the sensing unit. It is also conceivable to arrange the antenna on a rolling bearing component other than the component bearing the sensing unit. For this purpose, the antenna is connected to. the sensing unit via a cable.

An antenna designed for a radio frequency of, for example, 2.4 GHz is only a few centimeters long and may be arranged for example in a coiled or meandering form.

In a further embodiment, with the sensing unit which can be remotely interrogated, the rolling bearing data can be sensed on the basis of the occurrence of an event.

In one variant, such an event is the arrival of an interrogation signal. For this purpose, the sensing unit advantageously has at least one passive SAW and/or BAW component. In such passive operation, the sensing unit obtains the energy necessary for functioning from an interrogation signal transmitted in the form of electromagnetic waves. For this purpose, the electromagnetic waves are received by a SAW element and are temporarily stored in the SAW element in the form of surface acoustic waves. In this variant without cable connections, even rolling bearing data from positions in a machine which can be accessed only with difficulty or cannot be reached at all via cable can be interrogated.

In a further variant of this embodiment, such an event is the changing of a measured variable. For this purpose, a component having piezoelectric material is advantageously functionally connected to the sensing unit in such a way that the sensing unit is supplied with a voltage generated by the piezoelectric effect by mechanical compression and/or tension, for example by vibrations, on the component. This activating unit has the task of making the SAW or BAW component send a signal when there are previously defined rolling bearing states (temperature, vibrations, strains . . . ). In this case, the activating unit connects the SAW or BAW sensor to the energy supply. An arrangement of background interest is described for example in U.S. Pat. No. 4,237,454.

The component based on the SAW or BAW principle advantageously has an integrated parameter memory which supplies one or more preset parameters in the remote interrogation. Such parameters are preferably coded information on the type of rolling bearing, place of manufacture, time of manufacture and/or serial number. The information stored makes possible a clear identification of the rolling bearings provided with corresponding sensing units. Furthermore, on account of the large number of SAW elements which can be manufactured with different codings, it is even possible to store more extensive manufacturer information and further static rolling bearing data in corresponding SAW elements.

The parameters of a rolling bearing may also be stored in various sensing units provided on a rolling bearing, such that the overall information on a rolling bearing is distributed among a plurality of sensing units. As a result, either the number of differently coded SAW or BAW elements can be reduced or else the amount of information per rolling bearing can be increased.

For this purpose, the following known procedure is advantageously used. By setting reflectors on a SAW element at certain intervals, similar to known bar codes, the response signals of a SAW element are given an individual basic pattern so as to make it possible according to the number of reflectors and intervals between the reflectors to store information on the SAW element (Sensorik, Vol. 8, published by Karl Walter Bonfig, page 29).

The component based on the SAW or BAW principle is preferably designed for determining at least one of the measured variables, like temperature and strain.

Apart from the direct measurement of variables with the component itself, in a further variant, for determining a measured variable, the component based on the SAW or BAW principle is functionally connected to a sensor suitable for this measured variable. For this purpose, impedance-loadable SAW or BAW components are used, to which one or more sensors varying the impedance according to a variable to be measured are electrically connected. These are, for example, capacitive acceleration sensors or sensors for variables which cannot be measured by SAW elements themselves.

According to a preferred embodiment, the component based on the SAW or BAW principle is arranged such that the at least one sensed rolling-bearing measured variable allows at least one rolling-bearing characteristic variable to be derived. Examples here of rolling-bearing characteristic variables are:

rotational speed
  direction of rotation
  forces and moments in the three spatial directions
  translational and rotational vibrations
  translational and rotational vibration accelerations
  temperature.

An advantage of the use of SAW elements for measuring deformations caused by forces in the rolling bearing components is their greater sensitivity compared with conventional strain gages and their largely linear characteristics, which allow a greater measuring range with a higher resolution, i.e. with finer graduations with respect to the strains sensed, than can be achieved with strain gages. This is described for example in German laid-open patent application DE 195 15 788 A1, column 3, line 23 et seq. This document shows a flow meter in the form of a bending beam which is deflected proportionally to the flow velocity on account of an appropriately shaped flow-accepting profile. The strain gages or SAW elements fitted on the upper side and underside of the bending beam can be used for sensing the deflection and consequently for determining the flow rate.

The dissertation "Drehmomentmessung auf Basis von fernabfragbaren Oberflächenwellenresonatoren" [torque measurement on the basis of surface-wave resonators which can be remotely interrogated] by Dr. Jürgen Michel, Munich Technical University, Nov. 26, 1996, describes in section 2.35 on page 37 that the small dimensions of the SAW sensors make it possible for maxima and minima of mechanical vibrations into the MHz range to be correctly sensed by measuring instruments on customary objects.

In the VDI Progress Report, Series 8, No. 729, Section 4.5, the superiority of the SAW sensing unit with regard to accuracy and dynamics is mentioned.

On account of the greater sensitivity and the possibility of high-frequency interrogation with a high time resolution in the detection of strains, the SAW elements can even sense the minimal deformations occurring due to the structure-borne sound waves in the rolling bearing components.

Consequently, an early detection of damage can be performed with the rolling bearings according to the invention by analyzing the structure-borne sound occurring in the operating state.

The greater sensitivity with respect to the sensing of material strains by SAW elements also makes it possible to detect the strains occurring without significantly reducing the cross-sectional surface areas of the rolling bearing components.

The miniaturization of the sensing units according to the invention makes it possible for them to be fitted into rolling bearings of standardized sizes.

Furthermore, the simple and low-cost mass production of the SAW elements, their robustness and their long service life are of great advantage for use in rolling bearings.

A further advantage of these SAW or BAW sensors, in comparison with a strain gage, is that these sensors can at the same time measure a change in length or change in temperature and can also transmit fixed identification features of the SAW or BAW sensor simultaneously in the response signal. This advantage can be used for example for reporting back the position of the sensors when there are a plurality of sensors on a rolling bearing (response signal: identification signal and current measured value). If there are a plurality of rolling bearings in a housing, this identification signal can be used for assigning the response signal to a particular rolling bearing. Rolling-bearing-specific data required for the subsequent calculation of rolling bearing data can also be reported back in the identification signal.

BRIEF DESCRIPTION OF THE DRAWINGS

The arrangement of SAW or BAW sensors is explained by example with reference to the figures, in which like references denote like elements and parts.

DETAILED DESCRIPTION OF THE DRAWINGS

Figure 1:
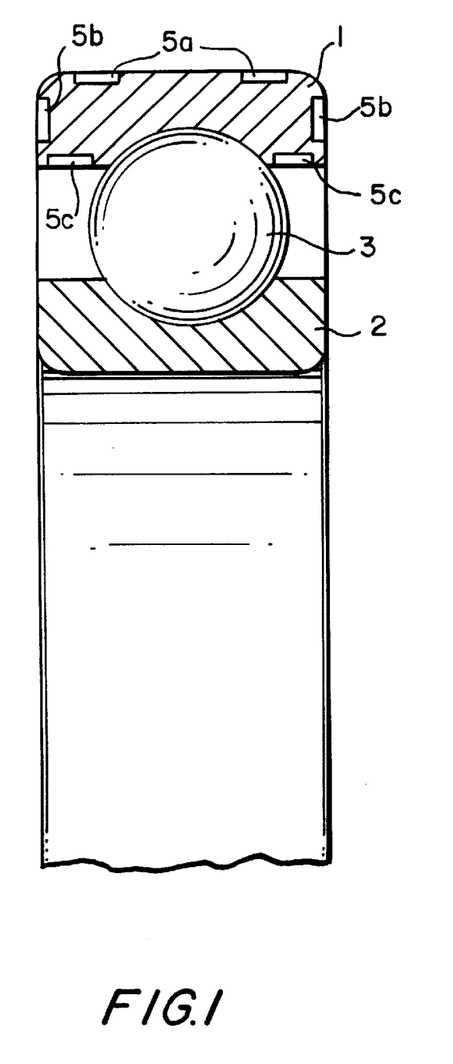
FIGS. 1–3 show respective embodiments of a rolling bearing, shown in cross-sections taken parallel to the axis of rotation.

The bearing in FIG. 1 includes an outer race 1 with a first running surface, inner race 2 with a second running surface opposed to and spaced from the first running surface, and rolling elements 3 between the running surfaces of the races. Annular grooves 5a, 5b, 5c formed in the outer and inner surfaces and the lateral sides of the outer race 1, receive a SAW or BAW sensor. The depth of individual grooves 5 is such that a usually flat SAW or BAW sensor can be received there. The number of annular grooves 5 used depends on the individual application.

Figure 2:
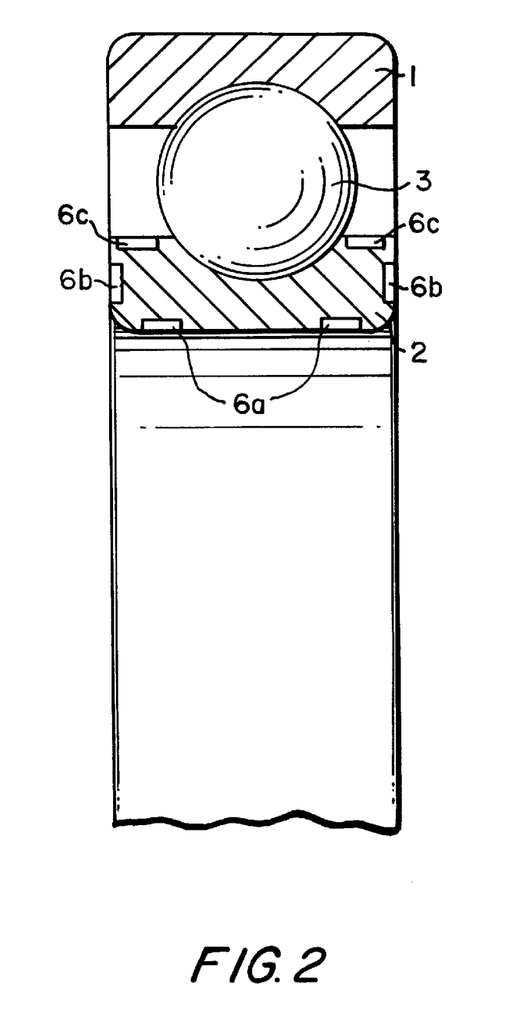

In the FIG. 2 embodiment of a rolling bearing there are again arranged between an outer race 1 and an inner race 2 a row of rolling elements 3. Differing from FIG. 1, in FIG. 2 there are annular peripheral grooves 6a, 6b, 6c in the outer, inner and lateral sides of the inner race 2.

Figure 3:
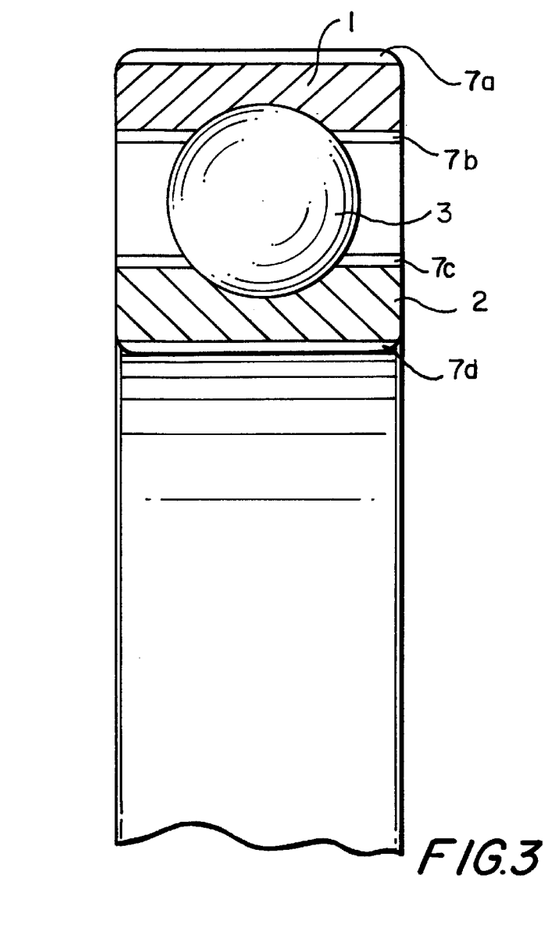

In the rolling bearing in FIG. 3 there are again arranged between an outer race 1 and an inner race 2 a row of rolling elements 3. Transversely running grooves receive a SAW or BAW sensor. Various positions at which the transverse grooves 7a, 7b, 7c, 7d can be arranged are shown. The depths of individual grooves is deep enough that a usually flat SAW or BAW sensor can be received there without protruding. The number of transverse grooves to be provided around the circumference of the race depends on the individual application. The antenna for the SAW or BAW sensors may be arranged on the side surface of the outer race or inner race.

Figure 4:
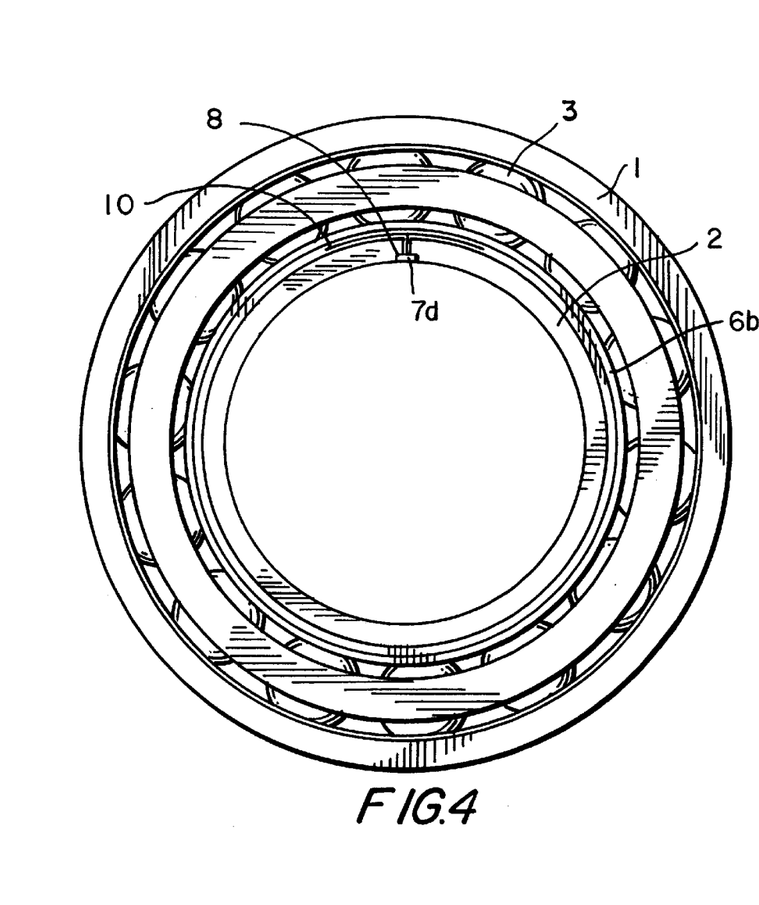
FIG. 4 shows a rolling bearing embodiment in plan view.

In FIG. 4, the SAW or BAW sensor 8 is arranged in a transversely running groove 7d in the inner race 2. The antenna 10 of the SAW or BAW sensor 8 is received in a groove 6b in the lateral side surface of the inner race 2. The antenna 10 is electrically shielded with respect to the inner race 2.

Sensors that may be disposed in grooves are described above. Their placement along the grooves is also described.

The force measurement works on the basis that the load supported by the bearing causes deformations in the races. These deformations are transferred to the sensing units with a SAW or BAW element. A signal with an effective value which is proportional to the force acting at the location of the sensing unit is produced at the rolling bearing.

The distribution of the load over the rolling elements of the rolling bearing is dependent on the bearing clearance, the fit of the rolling bearing races on the shaft and in the housing part, and on the form and rigidity of the shaft and of the housing part.

Theoretically, the load distribution in a rolling bearing is sensed most accurately by providing as many sensing units as possible in the region of the raceways. However, in practice, it is sufficient if the number of sensing units is chosen according to the number of rolling elements. This follows from the fact that the load is transferred from the rotating raceway to the stationary raceway via the individual rolling elements and from the equilibrium considerations for the bearing as a whole. It is possible by using an interpolation routine, as described in U.S. Pat. No. 5,952,587, to obtain good orientation for the rolling bearing forces with significantly fewer sensors.

To sense the direction of rotation, two sensing units are arranged next to each other and are activated by the individual rolling elements one after the other. If the distance between two rolling elements is different from the distance between the sensing units, the direction of rotation can be determined from the sequence of the signals generated.

To measure the translational and rotational vibrations, the masses are accelerated by the vibrations (surrounding parts and rolling bearings) generating forces of reaction in the rolling bearing. The deformations produced by the forces of reaction in the rolling bearing components can be sensed by means of SAW/BAW sensors. The SAW/BAW sensor signal can subsequently be further processed by an analysis by envelope detection. See FAG publication WL 80136 "Diagnose von Wälzlagern in Maschinen und Anlagen" [diagnosis of rolling bearings in machines and installations].

The document;Sensorik, Vol. 8, published by Karl Walter Bonfig, describes how SAW sensors can be used as temperature sensors. The temperature of a rolling bearing, in particular the sometimes different temperature of the raceways, is of great significance, since the bearing clearance is directly dependent on the temperature. An excessive temperature or a temperature difference between the inner race and the outer race may indicate damage to the rolling bearing or even imminent failure of the rolling bearing. Furthermore, if lubricant is lacking in the rolling bearing, a rise in temperature can be registered by the sensing units.

Figure 5:
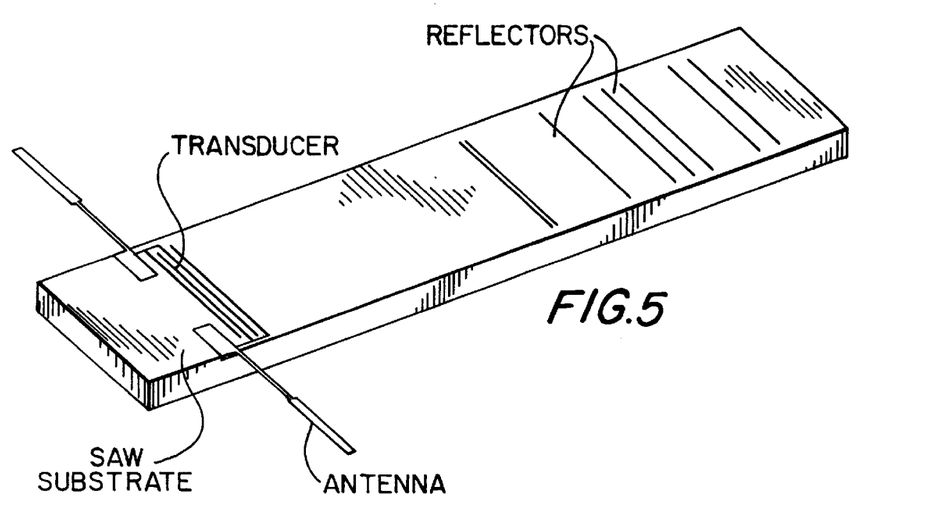
FIG. 5 shows an example of an SAW sensing unit that is usable with the invention.

FIG. 5 shows an example of an SAW sensing unit that is usable with the invention.

Figure 6:
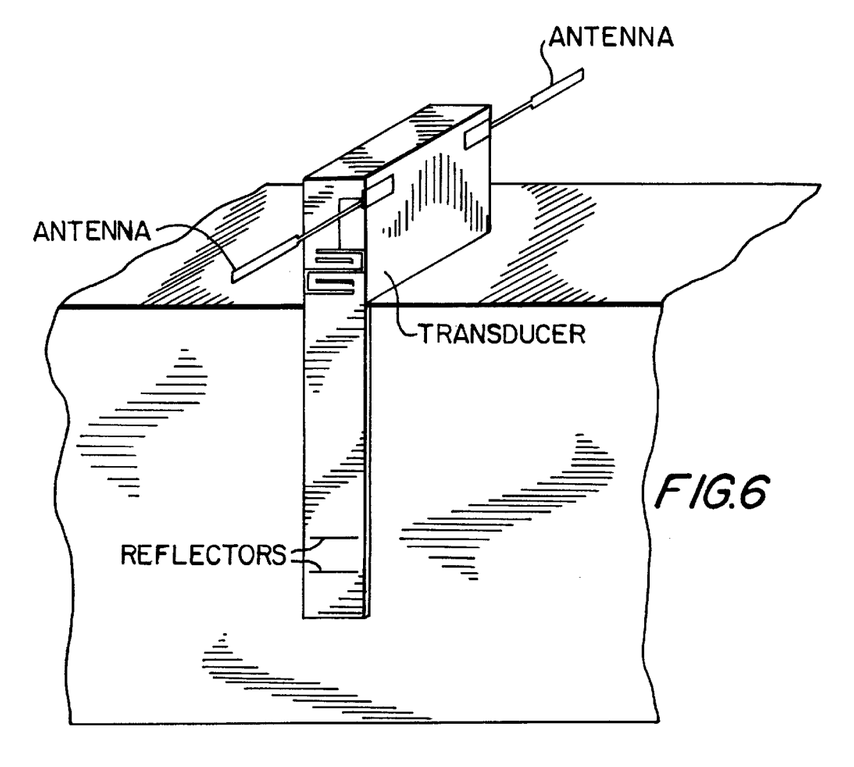
FIG. 6 shows an example of a BAW sensing unit that is usable with the invention.

FIG. 6 shows an example of a BAW sensing unit that is usable with the invention.

Figure 7:
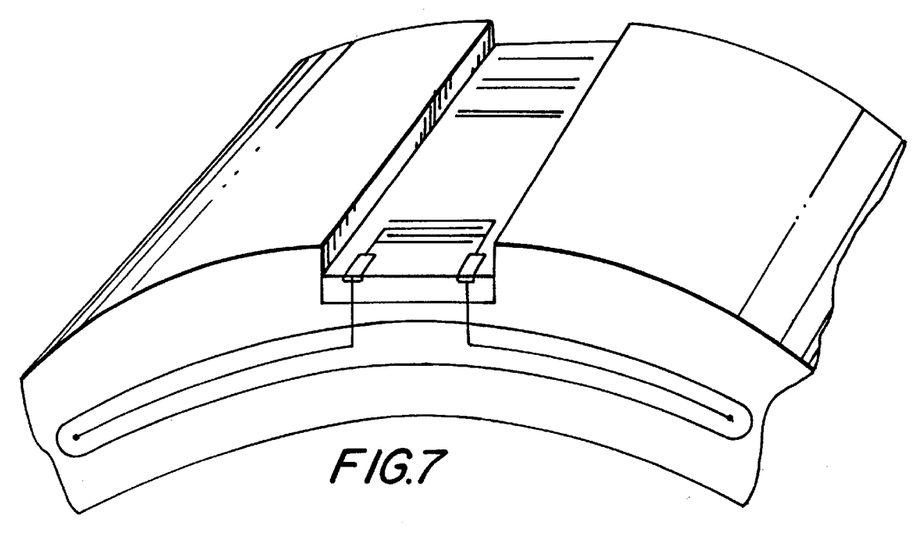
FIG. 7 is a detail view showing an SAW sensing unit accommodated in a groove in a bearing race.

FIG. 7 is a detail view showing an SAW sensing unit accommodated in a groove in a bearing race.

Figure 8A:
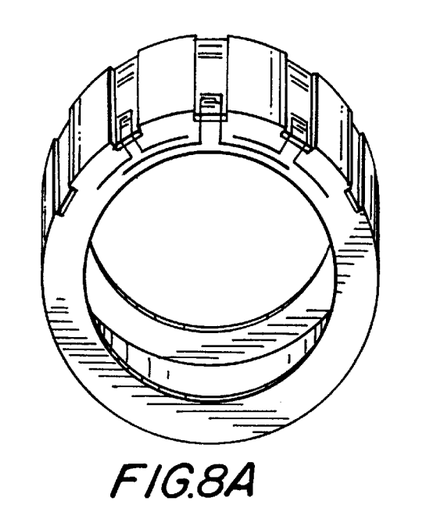
FIGS. 8A and 8B each show a plurality of SAW sensing units accommodated in grooves, the grooves being formed respectively in an outer surface of an outer race, and an inner surface of an inner race.
Figure 8B:
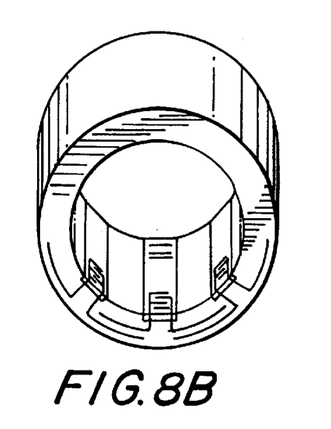

FIGS. 8A and 8B each show a plurality of SAW sensing units accommodated in grooves, the grooves being formed respectively in an outer surface of an outer race, and an inner surface of an inner race.

Figure 9:
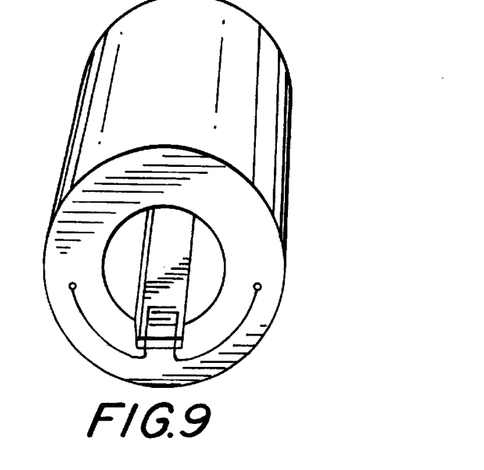
FIG. 9 shows a SAW sensing unit accommodated in a groove which is formed in an inner surface of a roller.

FIG. 9 shows a SAW sensing unit accommodated in a groove which is formed in an inner surface of a roller.

Figure 10A:
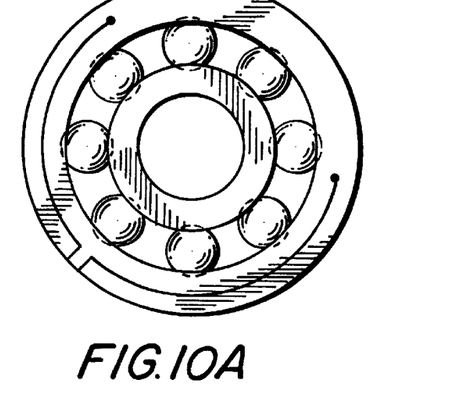
FIGS. 10A, 10B and 10C are schematic views showing different locations for an antenna of a sensing unit, on an outer race, on an inner race, and on a shield, respectively.
Figures 10B, 10C, 11:
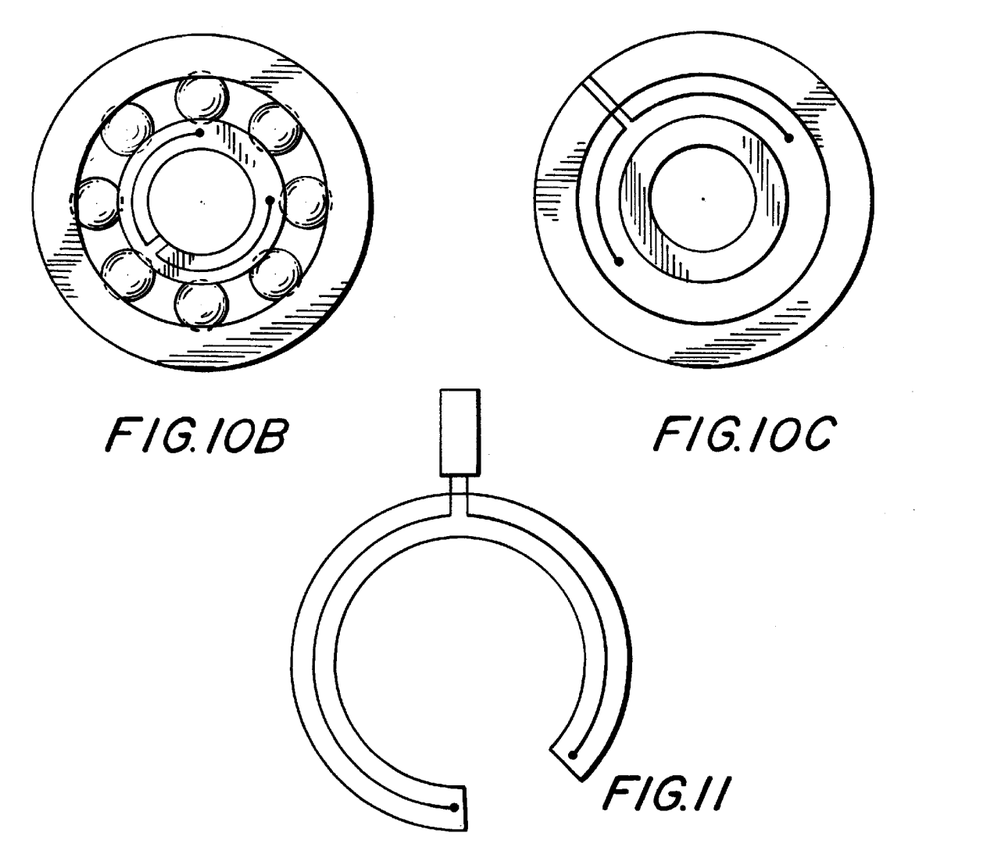
FIG. 11 is a detail showing an example of a shape of an antenna and its placement with respect to a sensing unit.

FIGS. 10A, 10B and 10C are schematic views showing different locations for an antenna of a sensing unit, on an outer race, on an inner race, and on a shield, respectively.

FIG. 11 is a detail showing an example of a shape of an antenna and its placement with respect to a sensing unit.

Figure 12:
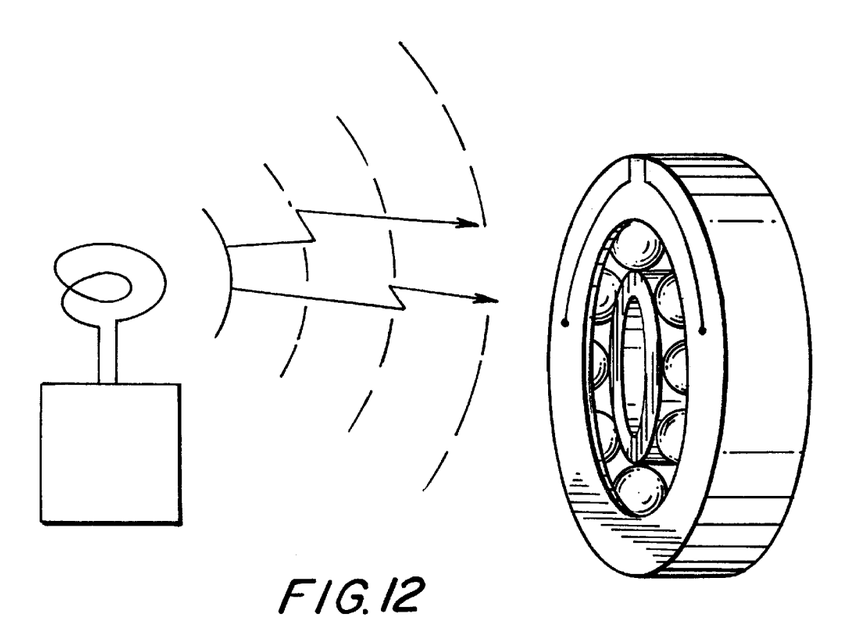
FIG. 12 is a schematic view showing a remote element sending a radio signal via its own antenna to the antenna of a sensing unit on the rolling element.

FIG. 12 is a schematic view showing a remote element sending a radio signal via its own antenna to the antenna of a sensing unit on the rolling element.

Figure 13:
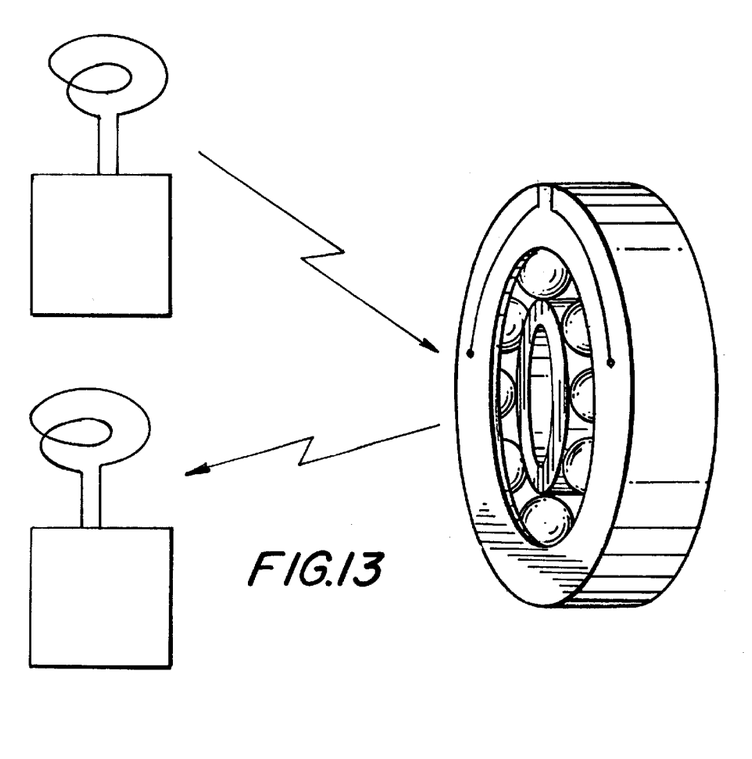
FIG. 13 is a schematic view showing a first remote element interrogating a sensing unit on a rolling element and a second remote element receiving the signal from the sensing unit.

FIG. 13 is a schematic view showing a first remote element interrogating a sensing unit on a rolling element and a second remote element receiving the signal from the sensing unit.

Figure 14:
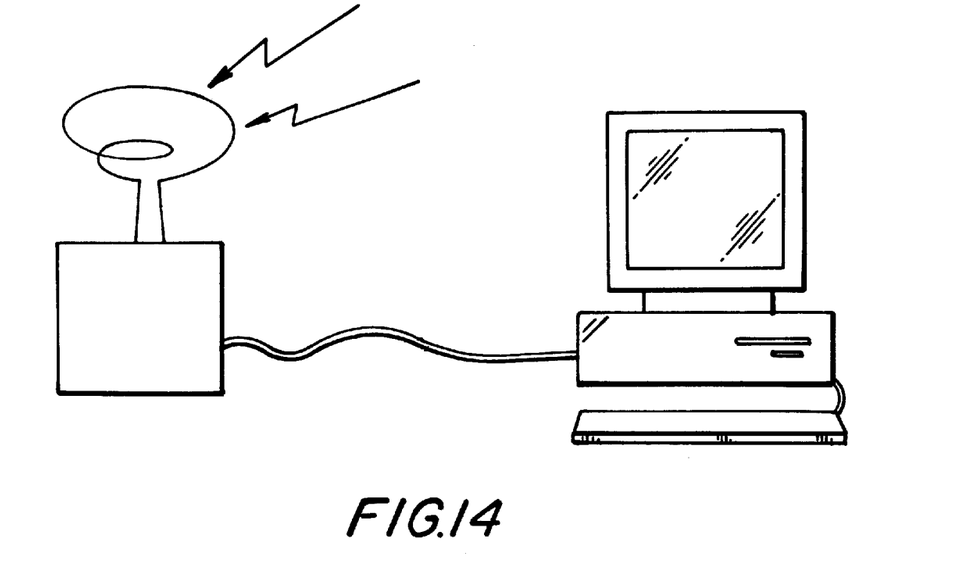
FIG. 14 is a schematic view showing a remote element receiving and processing a radio signal from a sensing unit (not shown), to generate sensing data and connected to a computer by a cable for transmitting the sensing data to the computer.

FIG. 14 is a schematic view showing a remote element receiving and processing a radio signal from a sensing unit (not shown), to generate sensing data and connected to a computer by a cable for transmitting the sensing data to the computer.

Figure 15:
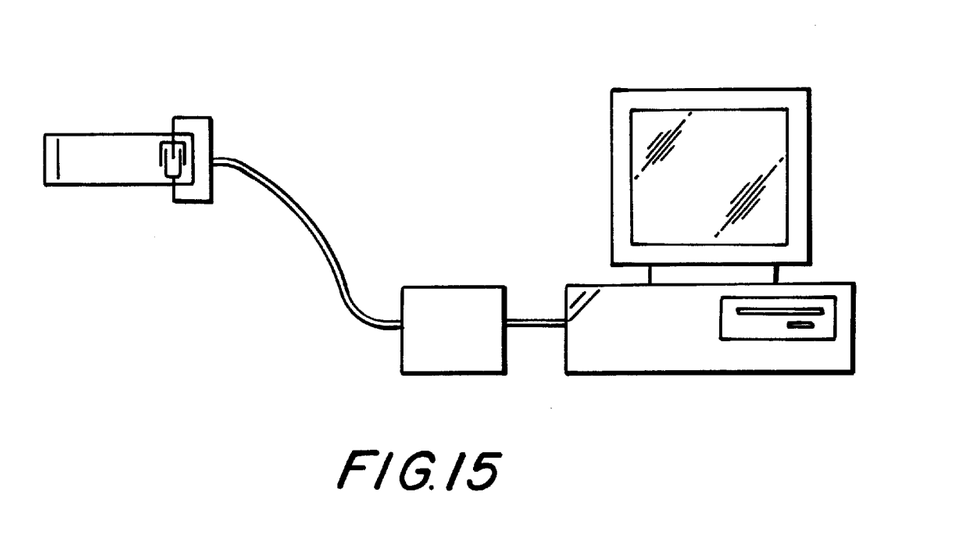
FIG. 15 is a schematic view showing a sensing unit connected for transmitting a sensing signal to a signal receiver via a cable, the signal receiver processing the signal and providing the sensing data to a computer by a further cable.

FIG. 15 is a schematic view showing a sensing unit connected for transmitting a sensing signal to a signal receiver via a cable, the signal receiver processing the signal and providing the sensing data to a computer by a further cable.

Although the present invention has been described in relation to particular embodiments thereof, many other variations and modifications and other uses will become apparent to those skilled in the art. For example, amplification and/or signal processing or conditioning circuits may be provided in the sensing unit as needed for a particular application. Any suitable signal transmitters and receivers may be employed for handling the sensing signals. The present invention is not limited by the specific disclosure herein.

We claim:

1. A rolling bearing comprising:
   a first bearing race including a first running surface, a second bearing race including a second running surface, the first and second running surfaces being opposed and spaced apart; bearing rolling elements arranged to run between the running surfaces as the races are in relative rotation with respect to each other;

at least one sensing unit integrated into at least one of the bearing races, the sensing unit including an antenna and the sensing unit being adapted to be interrogated by radio via the antenna;

the sensing unit including at least one component operating on a SAW or a BAW principle and the component being adapted to sense a change in at least one of a dimension and a temperature in the material of the respective one of the races at which the component is disposed, the sensing unit being operable to transmit a signal as to the result of the measurement back after arrival of the interrogating radio signal.

2. The rolling bearing of claim 1, wherein the at least one component which senses the changes is also adapted to transmit additional identification features to identify the respective at least one component so that a signal of a measured value may be matched to the respective sensing unit.

3. The rolling bearing of claim 2, wherein there are a plurality of the sensing components on at least one of the bearing races and each of the sensing components being adapted to transmit respective identification features in addition to transmitting sensed changes in order that a transmitted signal as to sensed changes may be assigned to a respective sensing unit.

4. The rolling bearing of claim 1, wherein the sensing unit and the antenna are arranged on the same one of the rolling bearing races.

5. A rolling bearing comprising:

a first bearing race including a first running surface, a second bearing race including a second running surface, the first and second running surfaces being opposed and spaced apart; bearing rolling elements arranged to run between the running surfaces as the races are in relative rotation with respect to each other;

at least one sensing unit integrated into at least one of the bearing races, a cable connected to the at least one sensing unit, the cable being adapted to transmit changes sensed by the sensing unit and to send the result of the measurement back to a control center after arrival of a control pulse on the cable;

the sensing unit including at least one component operating on a SAW or a BAW principle and the component being adapted to sense a change in at least one of a dimension and a temperature in the material of the respective one of the races at which the component is disposed, the sensing unit being operable to send the result of the measurement back after arrival of the control pulse.

6. The rolling bearing of claim 5, wherein the at least one component which senses the changes is also adapted to transmit additional identification features to identify the respective at least one component so that a signal as to the result of a measured value may be matched to a respective sensing unit, such that when there are a plurality of the sensing units on a cable, the identification features enable assigning a measured value signal to a respective sensing unit on the cable.

7. A rolling bearing comprising a first bearing race including a first running surface, a second bearing race including a second running surface, the first and second running surfaces being opposed and spaced apart; bearing rolling elements arranged to run between the running surfaces as the races are in relative rotation with respect to each other;

at least one sensing unit integrated into at least one of the bearing races, the sensing unit including an antenna and the sensing unit being adapted to be interrogated by radio via the antenna;

at least one component connected with the sensing unit, the component operating on the SAW or BAW principle and the component being operable to send coded identification features that are related to the at least one component back after the arrival of a radio signal via the antenna.

8. The rolling bearing of claim 7, wherein the coded information which the component can send comprises data selected from the group consisting of the type of rolling bearing, its place of manufacture, its time of manufacture and its identification indicator.

9. The rolling bearing of claim 7, wherein the respective coded identification features are stored in each of the plurality of components.

10. A rolling bearing comprising a first bearing race including a first running surface, a second bearing race with a second running surface, the first and second running surfaces being opposed and spaced apart; bearing rolling elements arranged to run between the running surfaces as the races are in relative rotation with respect to each other;

at least one sensing unit integrated into at least one of the bearing races, the sensing unit including an antenna and the sensing unit being adapted to be interrogated by radio via the antenna;

the sensing unit operating on the SAW or BAW principle; an energy supply and an activating unit connected with the sensing unit and being operable under selected conditions of the rolling bearing for activating the sensing unit to cause the sensing unit to emit a radio signal, and an antenna through which the sensing unit emits the radio signal.

11. A rolling bearing comprising a first bearing race including a first running surface, a second bearing race including a second running surface, the first and second running surfaces being opposed and spaced apart; bearing rolling elements arranged to run between the running surfaces as the races are in relative rotation with respect to each other;

at least one sensing unit integrated into at least one of the bearing races, the sensing unit including an antenna;

the sensing unit including at least one component operating on a SAW or a BAW principle for determining a measured variable; and a sensor connected with the sensing unit for sensing and measuring the variable.

12. The rolling bearing of claim 11, further comprising a cable for carrying an interrogation signal to the sensing unit and the sensor for enabling their interrogation about the variable.

13. The rolling bearing of claim 11, further comprising an antenna for receiving a radio signal, the antenna being connected with the sensing unit and the sensor such that the radio signal can interrogate the sensing unit and the sensor for determining the variable.

* * * * *